United States Patent
Crabb et al.

(10) Patent No.: US 12,515,286 B2
(45) Date of Patent: Jan. 6, 2026

(54) CLAMPING TABLE

(71) Applicant: Roadclipper Enterprises, Inc., Mt. Pleasant, TX (US)

(72) Inventors: Jeffery Crabb, Mt. Pleasant, TX (US); Benjamin Hansen, Mt. Pleasant, TX (US); Nicole Littrell, Campbell, TX (US); Robert Jase Merritt, Dekalb, TX (US); David W. Osmun, Mt. Pleasant, TX (US); Saul Ramirez, Mt. Vernon, TX (US); Arturo Vega, Mt. Pleasant, TX (US); Jose David Vega, Mt. Pleasant, TX (US); Valentin Vega, Mt. Pleasant, TX (US)

(73) Assignee: Roadclipper Enterprises, Inc., Mt. Pleasant, TX (US)

( * ) Notice: Subject to any disclaimer, the term of this patent is extended or adjusted under 35 U.S.C. 154(b) by 314 days.

(21) Appl. No.: 18/144,955

(22) Filed: May 9, 2023

(65) Prior Publication Data

US 2023/0364726 A1     Nov. 16, 2023

Related U.S. Application Data

(60) Provisional application No. 63/340,283, filed on May 10, 2022.

(51) Int. Cl.
*B23Q 3/06* (2006.01)
*B23Q 3/155* (2006.01)
*B24B 41/06* (2012.01)

(52) U.S. Cl.
CPC .......... *B23Q 3/069* (2013.01); *B23Q 3/1554* (2013.01); *B24B 41/06* (2013.01)

(58) Field of Classification Search
CPC ........ B23Q 3/069; B23Q 3/064; B23Q 3/082; B23Q 3/00; B25B 5/003; B25B 11/02; Y10T 29/49998; B23K 37/0435
USPC ...... 269/150, 34, 45, 289 MR, 35, 228, 226; 29/281.1, 281.5, 559
See application file for complete search history.

(56) References Cited

U.S. PATENT DOCUMENTS

| | | | | |
|---|---|---|---|---|
| 4,310,964 A | * | 1/1982 | Murphy ................... | B21J 15/10 29/469 |
| 4,995,146 A | * | 2/1991 | Woods ..................... | B64C 3/185 269/910 |
| 5,095,605 A | * | 3/1992 | Tonus ...................... | B27F 7/003 227/7 |
| 5,502,886 A | * | 4/1996 | Jensen ............... | B29D 99/0003 29/283 |
| 5,833,222 A | * | 11/1998 | Olden ....................... | B27F 7/15 269/304 |
| 5,904,348 A | * | 5/1999 | Sevy ......................... | B25B 5/12 269/236 |
| 6,119,843 A | * | 9/2000 | Robinson ............ | B65G 47/8823 198/345.3 |

(Continued)

*Primary Examiner* — Jason L Vaughan
(74) *Attorney, Agent, or Firm* — Harper & Bates LLP; Scott L. Harper (57) ABSTRACT

Apparatus and methods thereof used to clamp and secure workpieces of varying shapes and dimensions into position for welding, machining, and other fabrication activities. A plurality of opposing clamping assemblies attached to the clamping table operate to move and orient separate workpieces into a desired assembly position. The oriented workpieces are then clamped and held in a fixed position for welding, machining, or other fabrication activities.

10 Claims, 11 Drawing Sheets

(56) References Cited

U.S. PATENT DOCUMENTS

| | | | | |
|---|---|---|---|---|
| 6,978,987 | B2* | 12/2005 | Kanjee | B25B 5/006 |
| | | | | 269/910 |
| 9,676,497 | B2* | 6/2017 | Boyd | B64F 5/10 |
| 2012/0036705 | A1* | 2/2012 | Gehris | B25H 1/02 |
| | | | | 29/559 |
| 2014/0250675 | A1* | 9/2014 | Sherrill | B23Q 3/063 |
| | | | | 269/21 |
| 2015/0190924 | A1* | 7/2015 | Clees | B30B 1/00 |
| | | | | 74/490.01 |
| 2022/0063044 | A1* | 3/2022 | Lattanzi | B23Q 17/2291 |

* cited by examiner

CLAMPING TABLE

CROSS-REFERENCE TO RELATED APPLICATIONS

This application claims the benefit of U.S. Provisional Patent Application Ser. No. 63/340,283 filed May 10, 2022, and entitled "Clamping Table", which is incorporated herein by reference in its entirety.

TECHNICAL FIELD

The present disclosure relates generally to a clamping table and more particularly, a clamping table with multiple actuated clamping fixtures. The present disclosure also relates to methods for fabrication and welding of work pieces using the disclosed clamping table apparatus and methods.

BACKGROUND OF THE INVENTION

Clamping tables are commonly used in manufacturing to hold workpieces together in a fixed position for welding the pieces together, machining the workpieces or other fabrication activities. Clamping tables usually have product-specific parts or clamp fixtures which hold workpieces in place while being welded together. When a different type of workpiece requires welding, the clamp fixtures must be swapped out or have their orientation and position on the table relocated and adjusted accordingly. Creating workpiece specific clamping fixtures can be expensive and swapping or relocating clamping fixtures every time a different product requires welding can be inefficient in terms of labor and cost.

SUMMARY OF THE INVENTION

In one aspect, the present disclosure is directed to a clamping table that includes a base frame, a plurality of clamping assemblies, and a plurality of table actuators. The base frame includes a plurality of frame plates, at least one upper rail, at least one lower rail, a plurality of clevis plates 214, and a plurality of mounting rods. The frame plates are placed apart and oriented approximately in parallel. Each frame plate is connected to a mounting rod. The frame plates connect to the top rail and bottom rail. An individual clamping assembly includes a clamp plate, a slider plate, a wedge slide, a tube slider, a jaw, a jaw actuator, a piston and rollers attached at a terminal end of the jaw and opposing a roller attached to the wedge slide. Each clamping assembly is movably connected to the clamping table via a tube slider which surrounds the mounting rod, allowing opposing clamping assemblies to bi-directionally move and translate along the rod length. A jaw actuator with a movable piston to the jaw and the jaw actuator operates to open and close the jaw of each clamping assembly during the operation of the table. A table actuator is coupled to the base frame and to the clamping assembly and operates to move the clamping assembly bi-directionally along the rod length during the operation of the clamping table.

The clamping table disclosed herein may further include a conveyor frame which includes a conveyor rail, a plurality of conveyor mount channels, a plurality of rollers, and a plurality of conveyor uprights. The plurality of conveyor mount channels are connected substantially perpendicular to the conveyor rails. The conveyor rails connect to the conveyor mount channels near opposing ends of the conveyor mount channels. Each end of a conveyor mount channel also connects to a conveyor upright. Each conveyor upright connects to a conveyor mount channel on one end and a roller on the opposite end. The conveyor upright is oriented in a substantially perpendicular fashion to the conveyor mount channels and the conveyor rails. The plurality of conveyor uprights are oriented in a substantially parallel fashion. Each pair of conveyor uprights which are connected to the same conveyor mount channel are also coupled to the same roller. The plurality of rollers are oriented substantially parallel to the plurality of mounting rods. In various embodiments, the clamping table may further provide for the conveyor cylinders to vertically raise and lower the conveyor frame relative to the clamping table.

In yet another aspect, the present disclosure is directed to a method of using a clamping table assembly with a robotic welder that includes fixing a first workpiece into the recess in a clamp plate of one or more clamping assemblies of the clamping table, fixing a second workpiece into the recess in the clamp plate of one or more clamping assemblies opposite of the first of one or more clamping assemblies, placing a third workpiece on top of the arcuate surfaces of the opposing wedge slides of the one or more clamping assemblies of the clamping table, actuating the clamping assemblies and orienting, into a desired assembly position, the third workpiece between the first and second workpieces to form a beam shape, clamping and securing the formed beam into a fixed position, and welding the workpieces together to fabricate an engineered beam.

The method may further include the clamping table alternately releasing and engaging at least one clamp during welding operations to provide a continuous weld along the beam. The method may further include welding the workpieces together using at least one welding robot with machine vision capabilities to track along the desired weld joint.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

DETAILED DESCRIPTION OF THE INVENTION

The present invention relates to a clamping table apparatus that uses a plurality of manual or automated actuated clamping fixtures to hold one or more workpieces in a fixed position during fabrication operations. The present invention also relates to a method for conducting welding operations on one or more workpieces using the disclosed clamping table. A plurality of clamping assemblies allows the clamping table to hold and secure one or more workpieces of varying dimensions and shapes without needing to adjust, replace, or reconfigure the clamping table during manufacturing operations due to varying workpiece shapes and dimensions. When the clamping table is engaged and actively securing one or more workpieces in a fixed position, manufacturing processes such as welding may take place on the workpieces secured in position by the clamping table.

Figure 1:
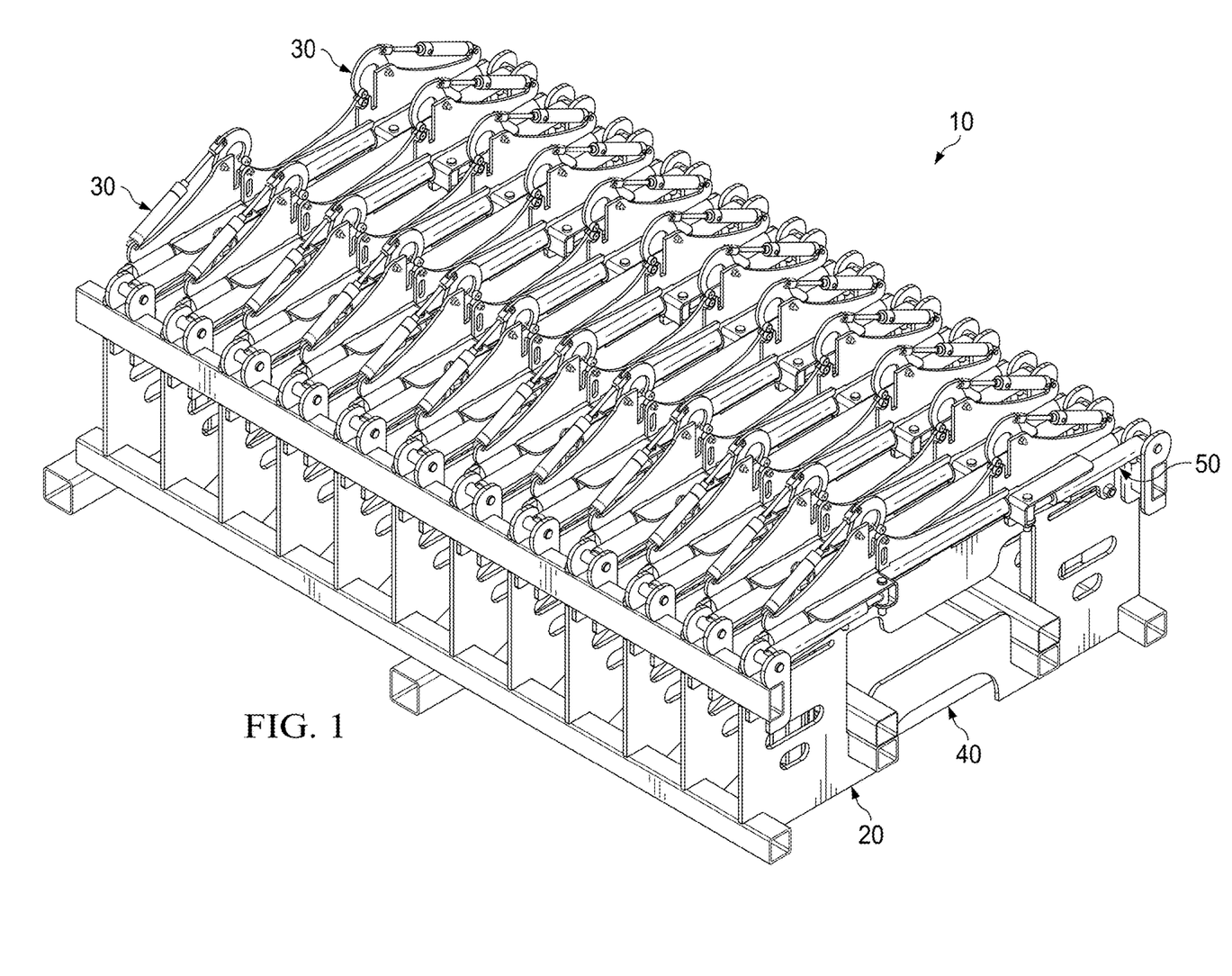
FIG. 1 is a front perspective view of an embodiment of the clamping table invention disclosed herein.
Figure 2:
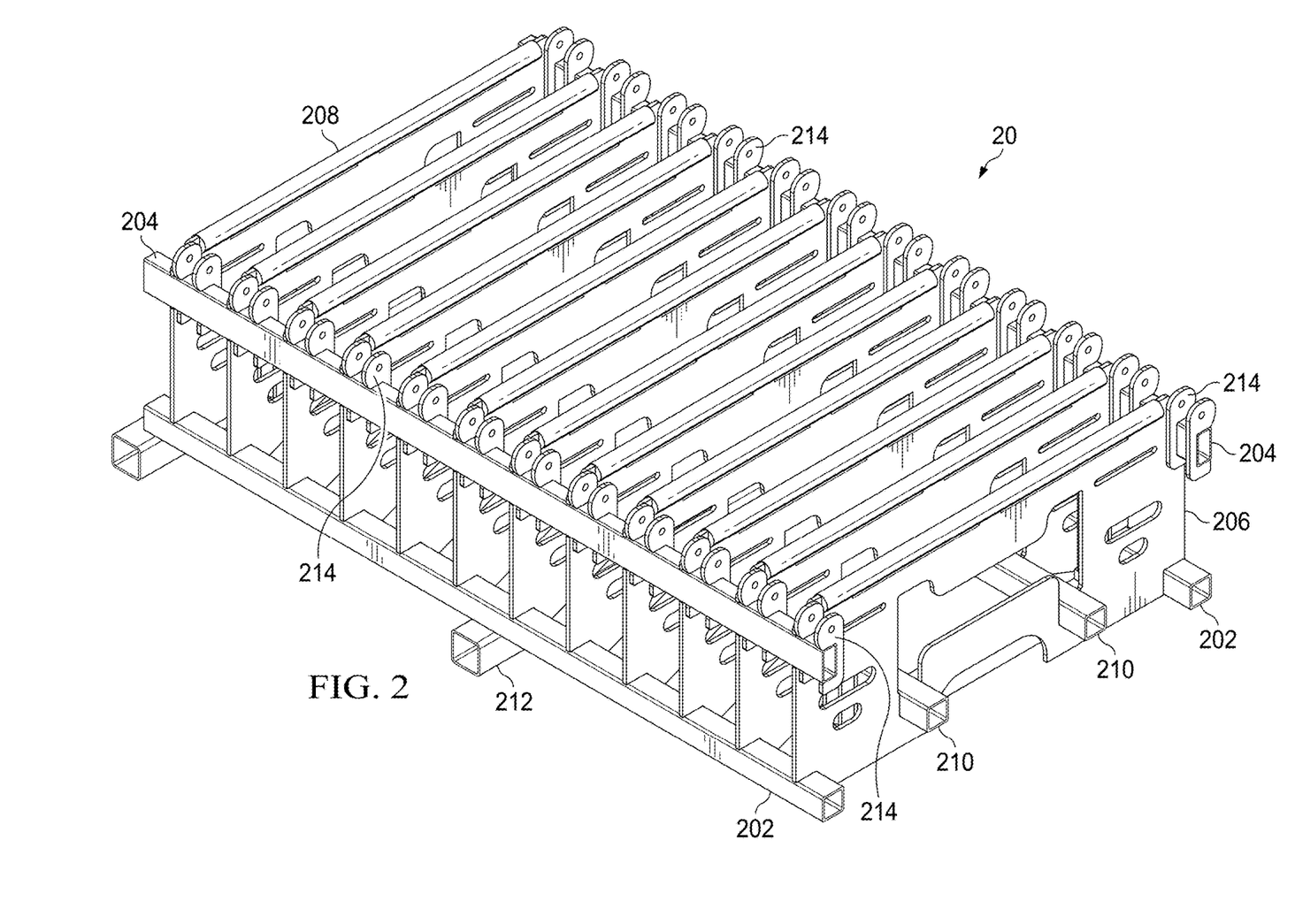
FIG. 2 is a front perspective view of an embodiment of a table frame of the clamping table invention disclosed herein.

Referring now to the drawings, where like reference numerals represent like components, FIG. 1 illustrates a front perspective view of an implementation of a clamping table 10 according to the present disclosure. The clamping table 10 comprises base frame 20, a plurality of attached clamping assemblies 30, and a plurality of attached table actuators 50. Table actuators 50 comprise hydraulic or pneumatically driven piston assemblies capable of extending and retracting a length of the piston to move each clamping assembly 30 attached to clamping table 10 along a length of rod 208 (as shown in FIG. 2). In an embodiment, clamping table 10 further comprises a conveyor frame 40 secured to the clamping table 10.

FIG. 2 illustrates a perspective view of base frame 20 of clamping table 10. Base frame 20 comprises a plurality of frame plates 206, a plurality of rods 208, one or more top rails 204, one or more bottom rails 202, and a plurality of clevis plates 214. Each of the rods 208 is positioned within a gap in a frame plate 206 and secured at opposing ends to the corresponding frame plates plate 206 with bolts, pins or other securing means as known in the art. A plurality of frame plates 206 are secured to top rails 204 near opposite top corners of the frame plates 206 and secured to bottom rails 202 near opposite bottom corners of the frame plates 206. Top rails 204 and bottom rails 202 are oriented in a substantially parallel fashion to each other, and the plurality of frame plates 206 are substantially equidistantly spaced apart along the length of top rails 204 and bottom rails 202 and oriented in a substantially parallel fashion to each other as depicted.

In an embodiment, frame plates 206 are equidistantly spaced generally at eight-inch spacing intervals along the lengths of top rails 204 and bottom rails 202. In other embodiments, the spacing of the frame plates 206 may be greater or smaller as appropriate for the intended use of the clamping table 10 for various workpieces. Rods 208, frame plates 206, top rails 204 and bottom rails 202 may be manufactured from steel, steel alloy or other high strength metals, alloys or materials sufficient to provide structural rigidity and performance without substantial deflection or deformation from forces imparted to or by the clamping table 10 during operations. In an embodiment, the dimensions of clamping table 10 are generally sixty inches in width by ninety-six inches in length. In an embodiment, rods 208 are generally forty-eight inches in length and two inches in diameter. Rods 208 may comprise solid or hollow tube construction from steel, metals, and alloy materials known in the art sufficient to support operational forces and stresses imparted on or to the clamping table 10 during operation. Rods 208 provide for substantial linear bi-directional movement and directional control of opposing clamping assemblies 30 during clamping table 10 operations, as discussed below.

In an embodiment, base frame 20 further comprises inner rails 210, which are located on opposite sides of an interior opening in frame plates 206, wherein inner rails 210 are oriented and attached in a substantially perpendicular fashion to frame plates 206. Clevis plates 214 are secured in dimensionally spaced intervals along the length of top rails 204 and provide attachment points for receiving and securing clamping assemblies 30. In an embodiment, base frame 20 further comprises at least one floor tube 212, which may be arranged and secured in a generally perpendicular orientation to bottom rails 202 to provide additional structural strength and support for clamping table 10.

Figure 3:
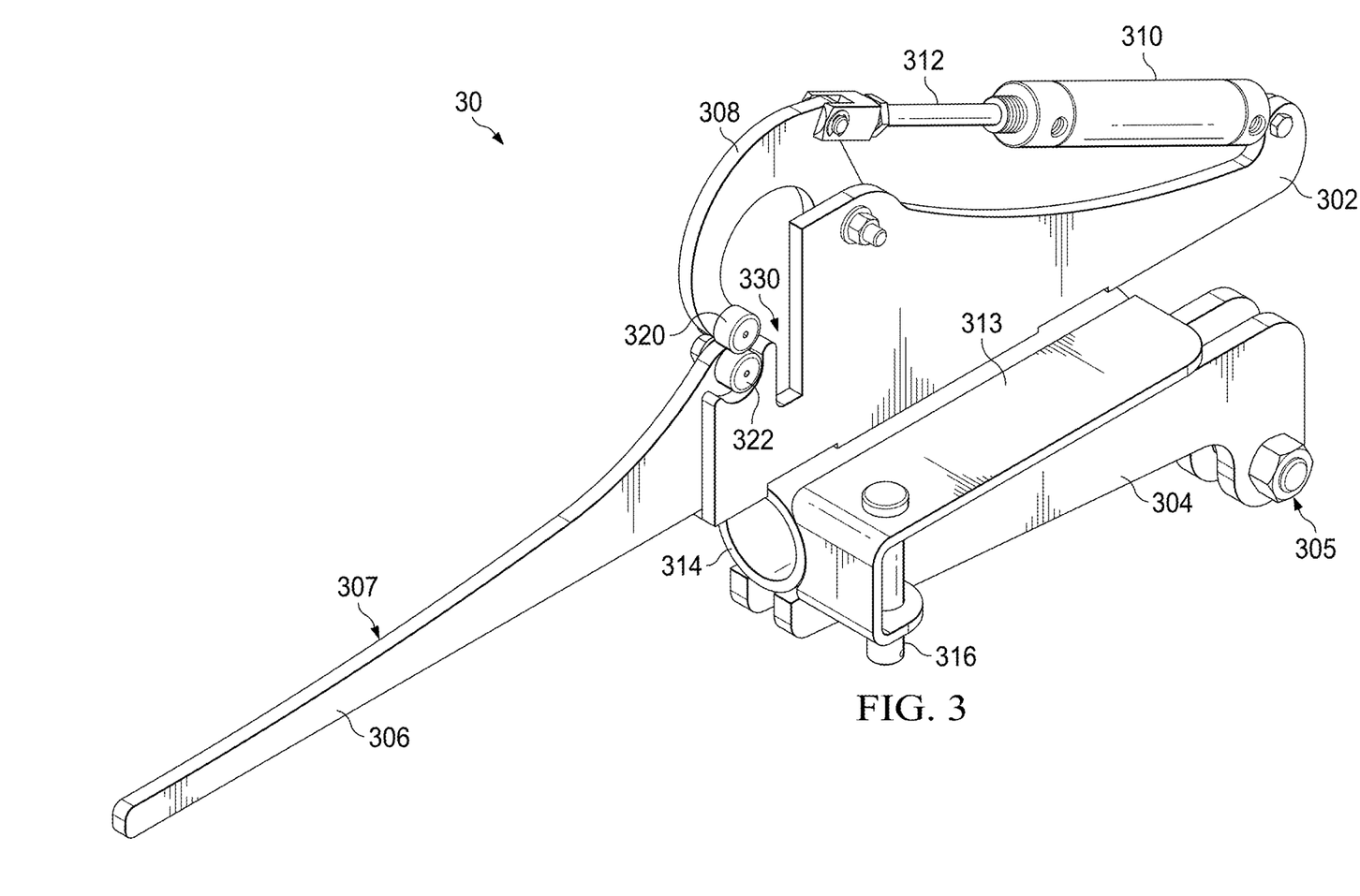
FIG. 3 is a front perspective view of an embodiment of a clamping assembly of the clamping table invention disclosed herein.
Figure 5A:
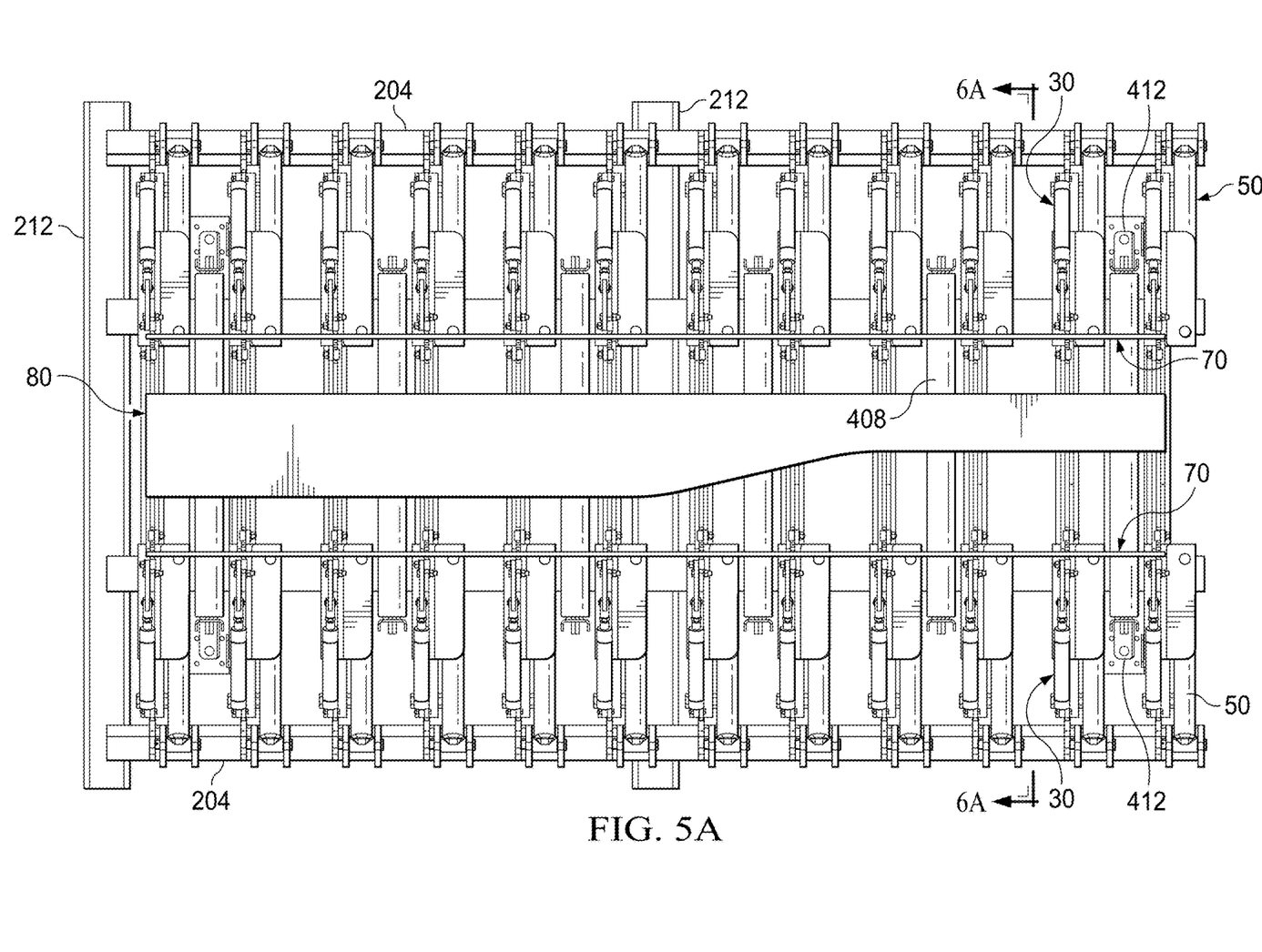
FIGS. 5A-C illustrate a top perspective view of an embodiment of the clamping table in various operational states according to the clamping table invention disclosed herein.
Figure 5B:
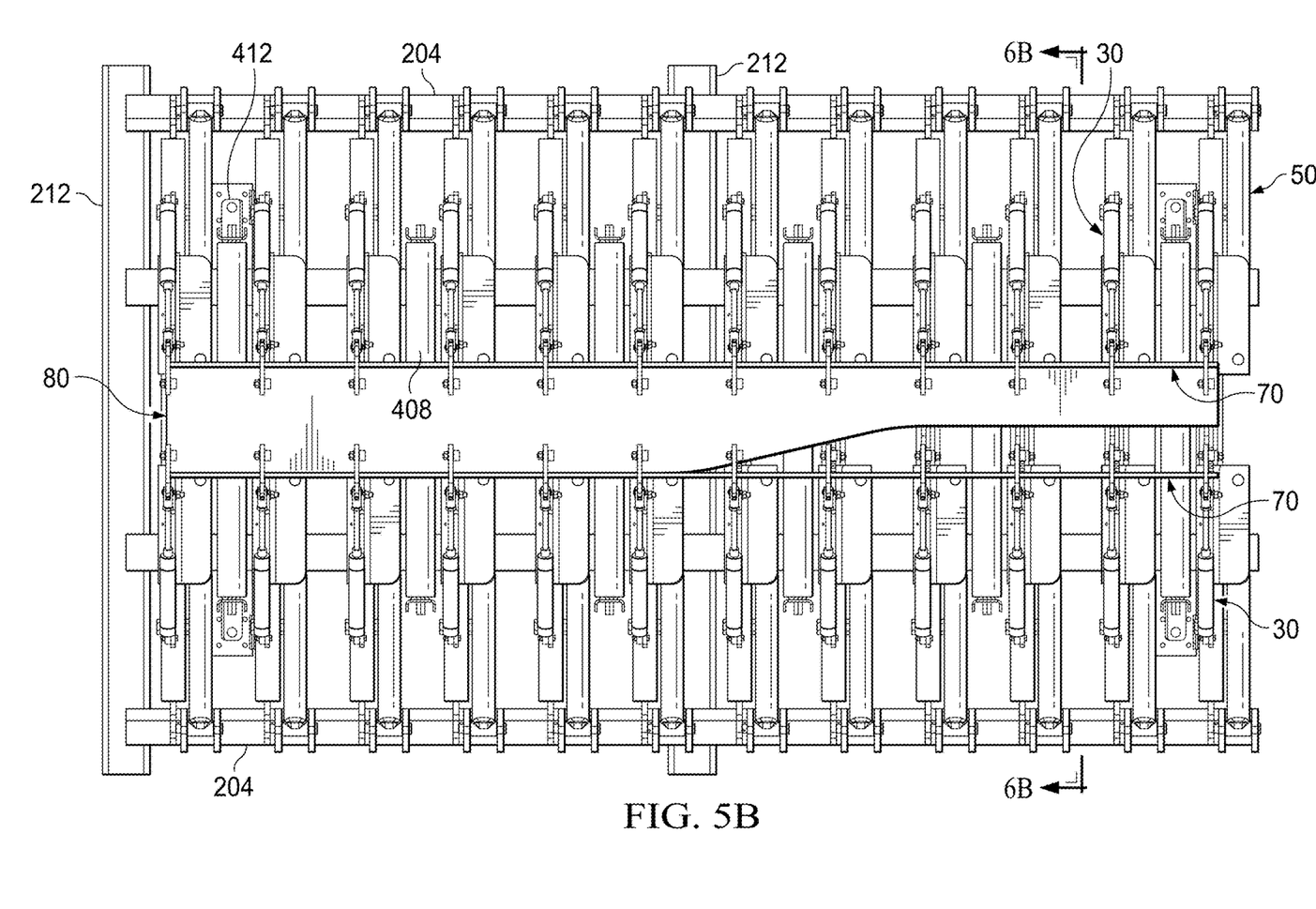
Figure 6A:
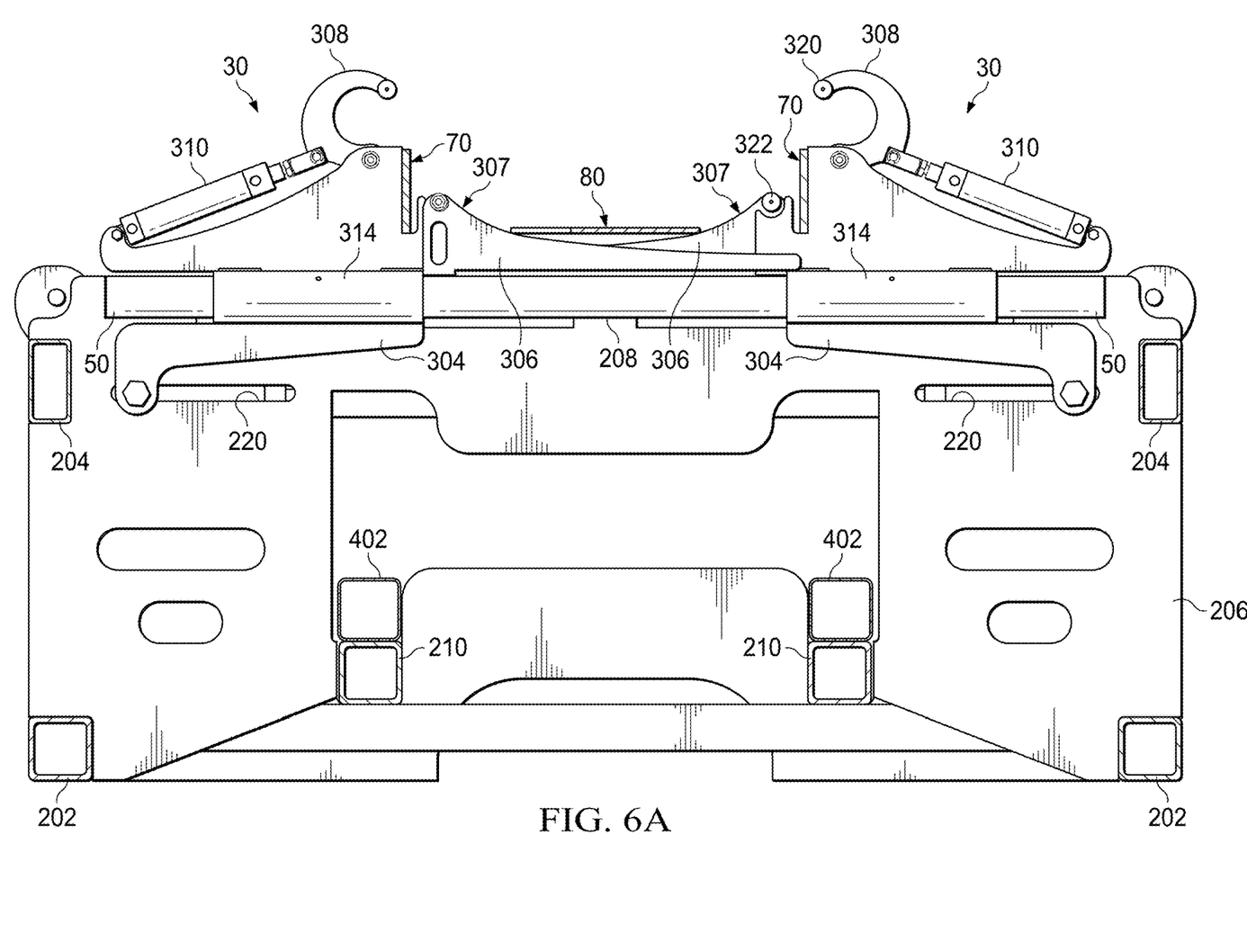
FIGS. 6A-C illustrate a front cross-sectional view of an embodiment of the clamping table in various operational states according to the clamping table invention disclosed herein; and, FIG. 7 is a perspective view of an embodiment of the clamping table showing the clamping table in a fully engaged operational state according to the clamping table invention disclosed herein.

FIG. 3 illustrates a perspective view of the components of clamping assembly 30. Clamping assembly 30 comprises clamp plate 302, slider plate 304, wedge slide 306, jaw 308, jaw actuator 310, piston 312, cylinder saddle 313 and tube slider 314. Clamp plate 302 and wedge slide 306 are fixed together by welding or other attachment means as is known in the art. Clamp plate 302 includes a formed recess 330 that supports and maintains the desired orientation of a workpiece inserted or fixed therein, such as a beam flange workpiece, during clamping table 10 operations. The dimensions of formed recess 330 may be modified to accommodate workpieces of variable dimensions. Each wedge slide 306 includes an arcuate or curved surface 307 of varying slope across the top length of wedge slide 306. Jaw 308 is rotatably secured to clamp plate 302 with a bolt, clevis pin or other detachable attachment means as known in the art. Cylinder saddle 313 and tube slider 314 are secured to slider plate 304 by weld or other attachment means known in the art. Jaw actuator 310 is detachably secured to clamp plate 302 and jaw 308 via bolts, clevis pins or other detachable attachment means as are known in the art. Jaw actuator 310 includes an extendible/retractable piston 312 which acts to open and close jaw 308 in an open or closed position. Rollers 320, 322 are detachably secured to a distal portion of jaw 308 and a distal portion of wedge slide 306. Rollers 320, 322 assist in the retention and adjustment of the desired orientation of the workpieces as they are moved and clamped into the desired configuration for the performance of manufacturing processes. Referring briefly to FIGS. 5A and 6A, clamping assemblies 30 are secured to the clamping table in opposing fashion across from each other, with wedge slides 306 of each clamping assembly 30 in substantially opposing orientation and each clamping assembly 30 slidably attached to rods 208.

Table actuators 50 are detachably secured to cylinder saddles 313 with clevis pins 316 or other attachment means as known in the art. Clevis plates 214 provide attachment points for securing table actuators 50 to the base frame 20. Table actuators 50 may comprise pneumatic, hydraulic or other motive piston apparatus capable of extending or retracting a piston to provide bi-directional mechanical force sufficient to cause clamping assemblies 30 to axially translate along rod 208 bi-directionally during clamping table 10 operations.

Figure 4:
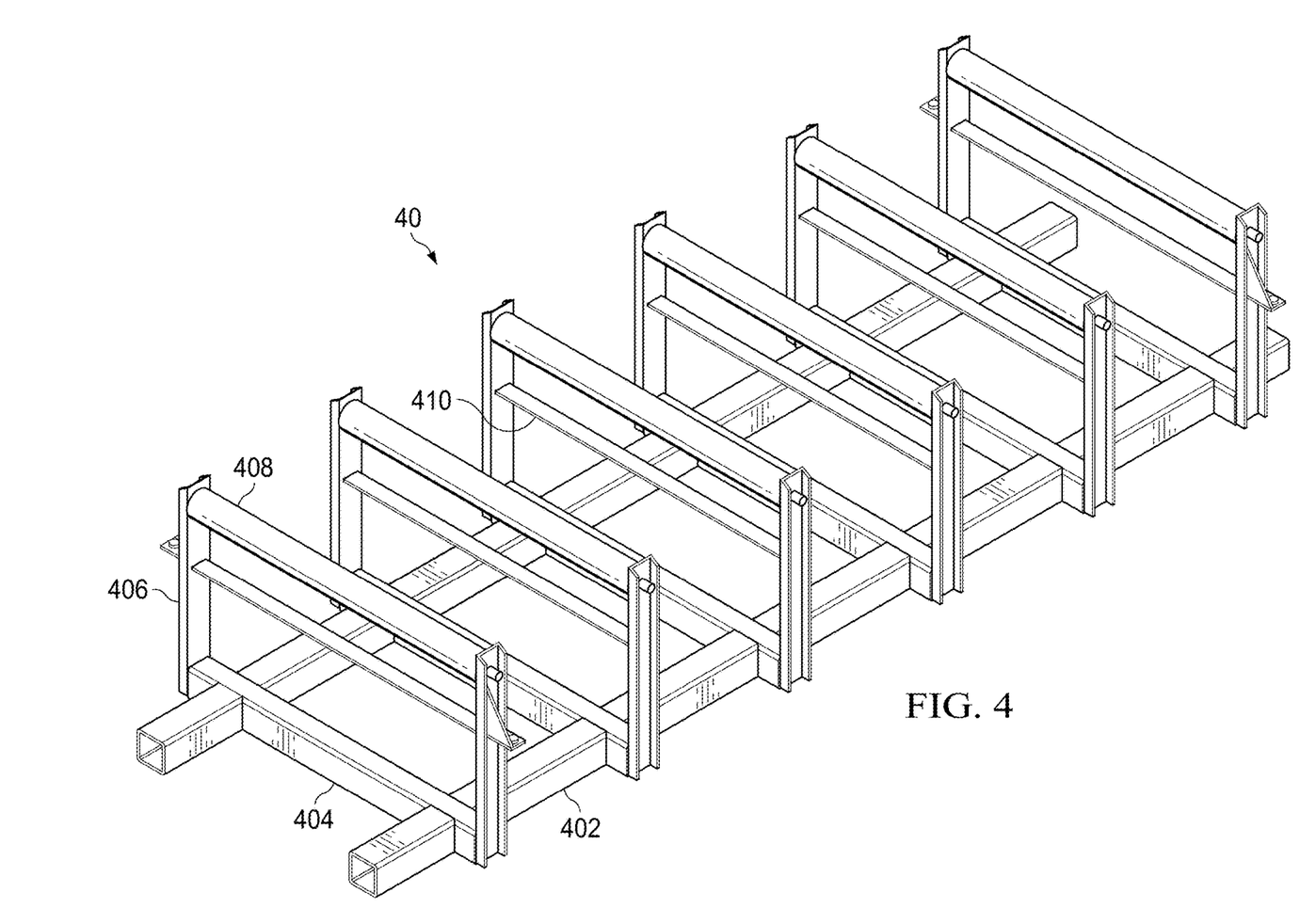
FIG. 4 is a front perspective of an embodiment of a conveyor frame of the clamping table invention disclosed herein.

FIG. 4 illustrates a perspective view of conveyor frame 40. Conveyor frame 40 operationally acts to convey work pieces along the length of the clamping table 10 during operations. Conveyor frame 40 comprises conveyor rails 402, a plurality of conveyor mount channels 404, a plurality of conveyor uprights 406, and a plurality of attached rollers 408. Conveyor mount channel 404 comprises a first end and second end. Conveyor uprights 406 comprises a first end and a second end. Rollers 408 comprises a first end and a second end. In an embodiment, conveyor frame 40 comprises conveyor rails 402 which are oriented substantially parallel to each other. The plurality of conveyor mount channels 404 are secured to conveyor rails 402 in a substantially perpendicular orientation. Conveyor rails 402 connect to conveyor mount channels 404 near opposing ends of conveyor mount channels 404. Conveyor rails 402 may be welded to conveyor mount channels 404 or otherwise secured as known in the art. Each end of conveyor mount channel 404 is also connected to a first end of conveyor upright 406. Each conveyor upright 406 is oriented in a substantially perpendicular fashion to conveyor mount channels 404 and conveyor rails 402. Conveyor uprights 406 are also all oriented in a substantially parallel fashion. The second end of each conveyor upright 406 is connected to a roller 408 and each roller 408 is connected to conveyor uprights 406 which also connect to the conveyor mount channel 404 as shown. Conveyor uprights 406 may be connected to rollers 408 with threaded bolts, screws, or other attachment means as are known in the art. The plurality of rollers 408 are oriented in a substantially parallel fashion to the plurality of mounting rods 208.

In an embodiment, conveyor frame 40 further comprises at least one conveyor cylinder 412 which operates to lower or raise the conveyor frame 40 in the vertical direction. Conveyor cylinder 412 may comprise hydraulic, pneumatic or other motive apparatus configured to raise or lower the conveyor frame 40. In an embodiment, conveyor frame 400 further comprises four conveyer cylinders 412 which are each coupled to a different conveyor upright 406. In an embodiment, one or more of rollers 408 are motorized and rotate to move a workpiece resting on rollers 408 along the length of clamping table 10 during manufacturing operations. In an embodiment, conveyor frame 40 further comprises a plurality of support rails 410. Each support rail 410 comprises a first and second end. Each support rail 410 is connected to two support uprights 406 that are connected to the same conveyor mount channel 404. The plurality of support rails 410 may be oriented in a substantially parallel fashion to the plurality of rollers 408 and operate to provide additional structural support to conveyor frame 40.

FIGS. 5A-5C and FIGS. 6A-6C illustrate a top view and side view, respectively, of the clamping table 10 in various operating states. The depicted embodiment will demonstrate the ability of clamping table 10 to secure and hold beam web workpiece 80 of variable web width between two beam flange workpieces 70 to shape and form an engineered beam by clamping the workpieces into the desired position and performing welding operations while maintaining the workpieces in the desired position. FIGS. 5A and 6A show the clamping table 10 in a partially engaged state. Beam web workpiece 80 with a variable width dimension rests on a portion of the arcuate top surfaces 307 of opposing wedge slides 306. Beam flange workpieces 70 are placed or fixed into the formed recesses 330 of opposing clamping assemblies 30.

Referring back to FIG. 5B, table actuators 50 are energized and impart an axial force to the opposing clamping assemblies 30, which begin moving towards one another. Opposing jaw actuators 310 are energized and rotate opposing jaws 308 into a closed position where rollers 320, 322 are in contact with each other. In this position, jaws 308 assist in retaining beam flanges 70 into relatively fixed vertical orientations while opposing clamping assemblies 30 are moving towards each other. As opposing wedge slides 306 continue to move closer to each other, beam web 80 continues to rise in vertical elevation due to the arcuate shape top surfaces 307 of opposing wedge slides 306, relative to the opposing beam flanges 70, which are moving closer together in proximity to beam web 80 oriented between them.

Figure 5C:
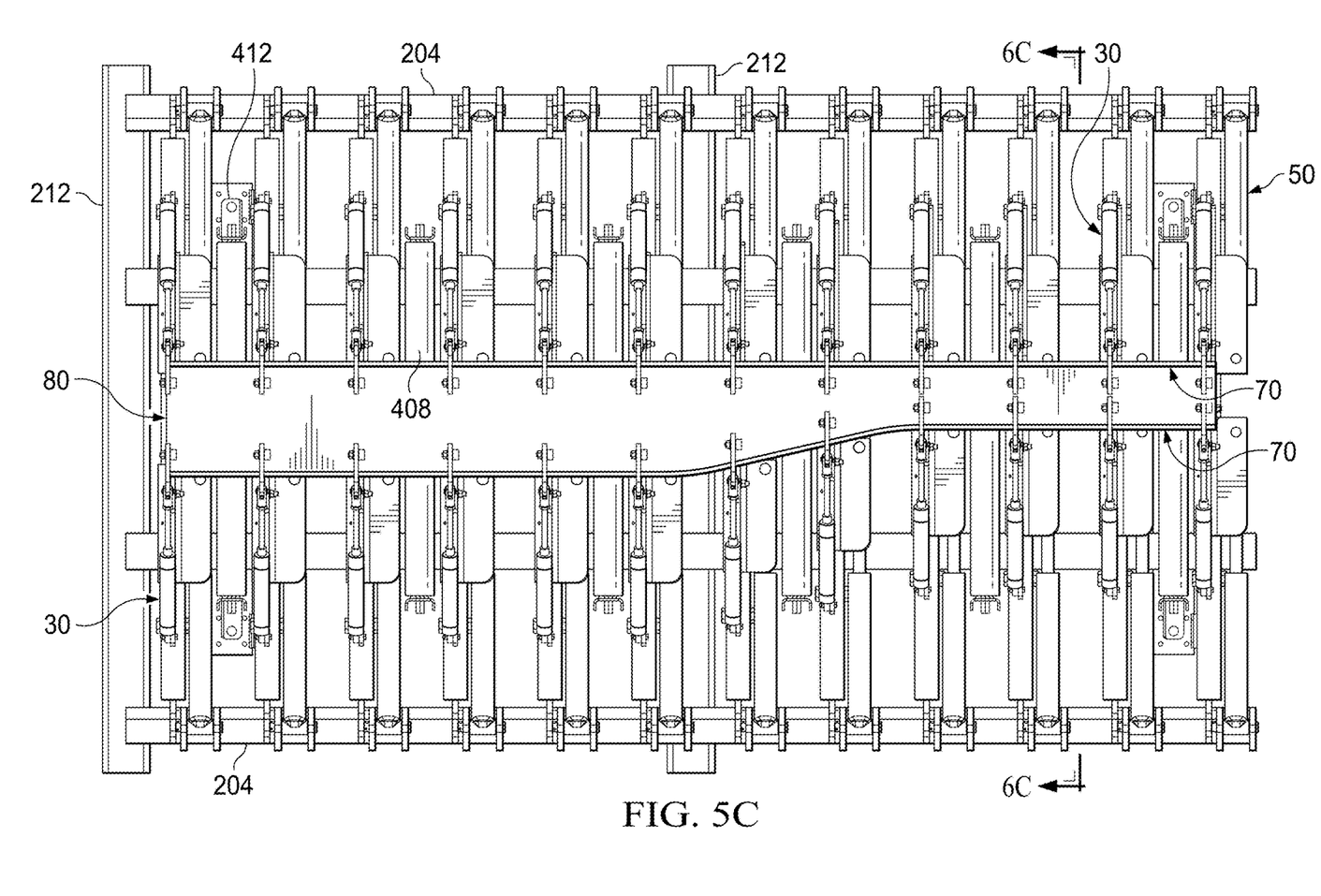
Figure 6B:
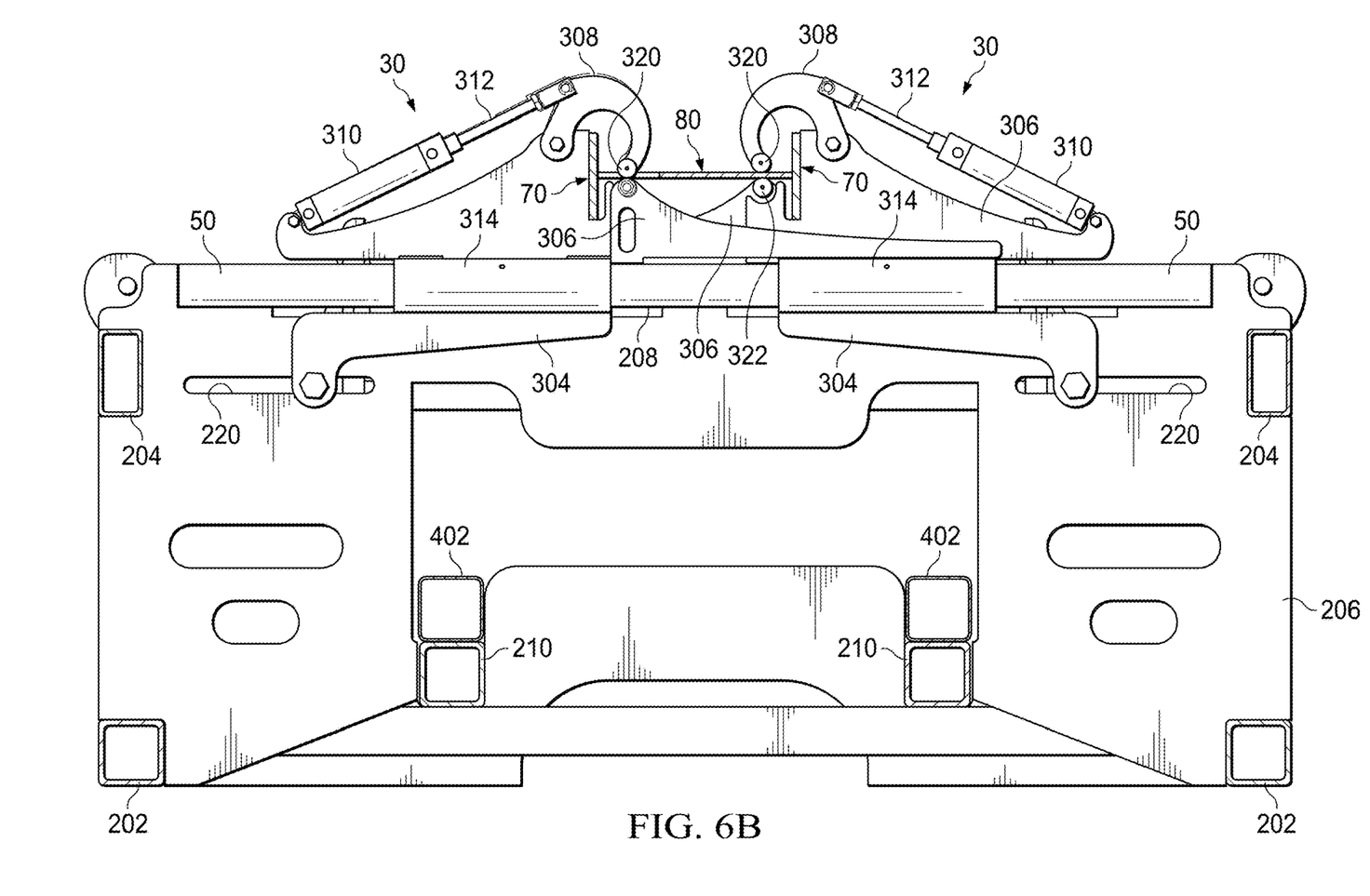
Figure 6C:
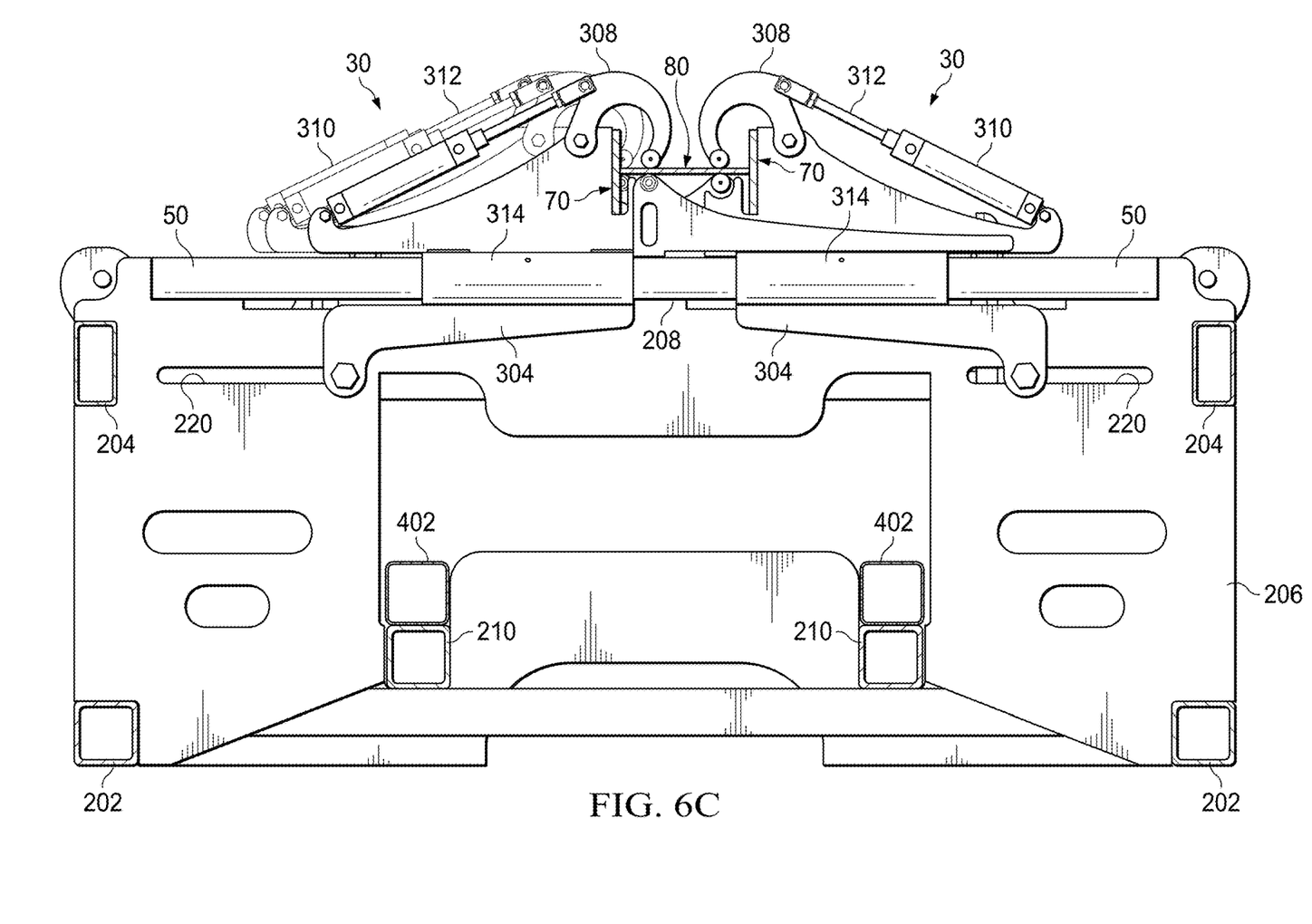

As shown in FIG. 6B, beam flanges 70 come into first contact with the widest dimension of beam web 80 (depicted in FIGS. 5B and 6B) and movement of each individual opposing clamping assembly 30 is stopped and held in place once beam flange 80 is pressed into sufficient contact with beam flanges 70. Once sufficient force is applied to press a portion of beam flanges 70 into contact with beam web 80, jaw actuator 310 retracts to allow jaw 308 to partially open and travel along a portion of the top surface of beam flange 70 until the clamping assembly 30 is in the desired position. Jaw actuator 310 maintains sufficient force imparted to jaw 308 and roller 320 to maintain beam flanges 70 and beam web 80 in the desired configuration for welding or other manufacturing processes. The remaining opposing clamp assemblies 30 continue to move towards each other in a staggered formation until beam web 80 comes into contact with beam flanges 70 along the length of the variable width beam web 80 dimensions as depicted in FIGS. 5C and 6C.

Figure 7:
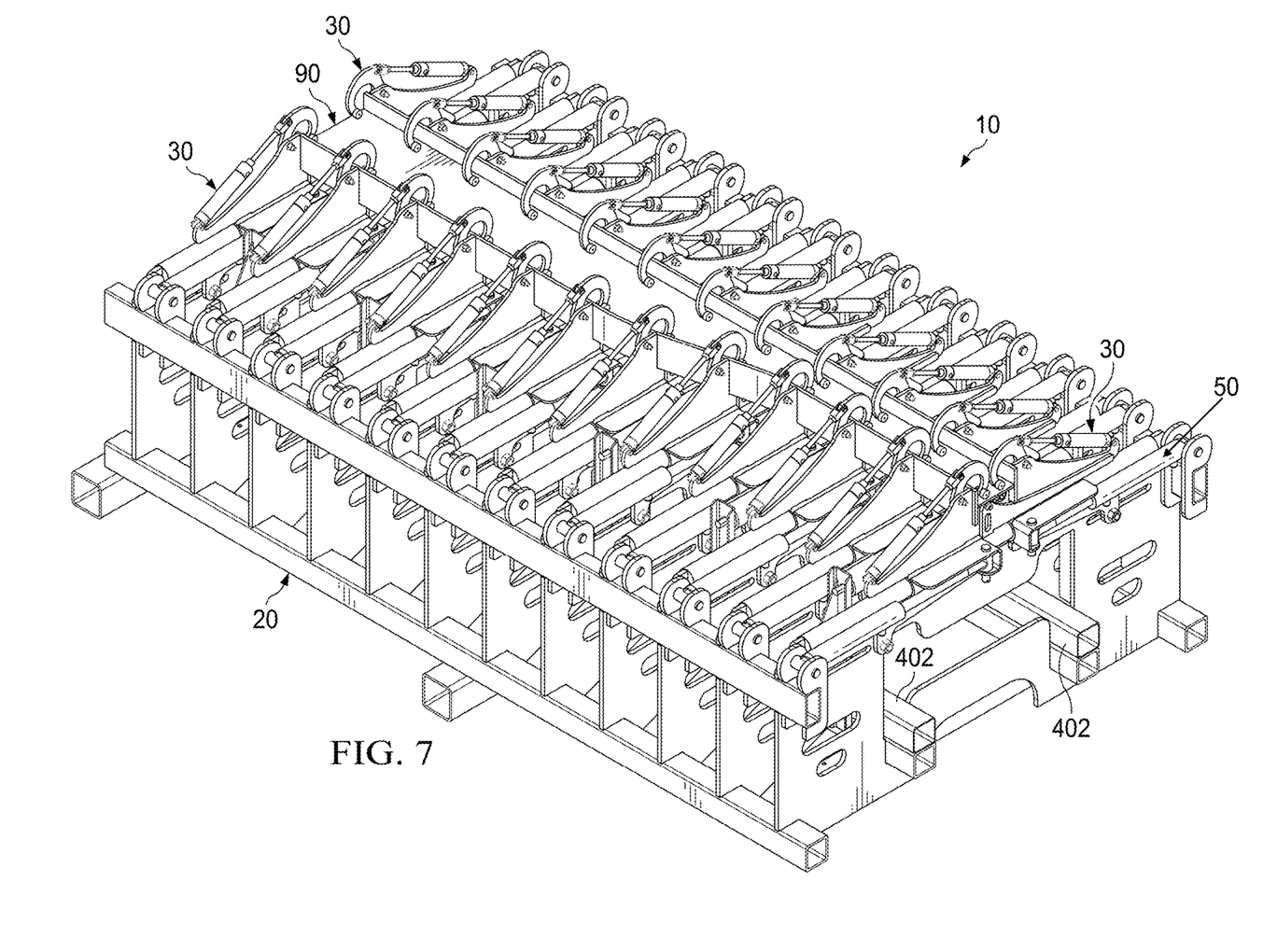

Turning to FIG. 7, once the length of beam flanges 70 and beam web 80 are in contact with each other in the desired configuration, opposing clamp assemblies 30 stop moving in the lateral direction and hold the formed beam work piece in place for welding or other manufacturing process to be initiated and result in the fabrication of an engineered beam 90 in the depicted embodiment.

In certain embodiments, robotic welding apparatus may be used in the fabrication and welding process. A robotic arm may be used to place the parts for welding onto the clamping table 10. A robotic welding system may be used to weld the workpieces on the clamping table 10 together after the clamping table 10 has been fully engaged with the workpieces. In an embodiment, clamping table 10 may alternately raise or lower at least one jaw 308 to allow the welding tip to pass unobstructed along the weld joint path on the workpiece so as to provide a continuous weld. By alternately raising or lowering jaw 308 of each clamp assembly 30, the welded seam is monolithic and results in a structurally stronger workpiece, improving welding operations efficiency. The welding operation may be performed by persons or by robots.

A robotic welding system may include a plurality of robotic arm and an arc welding torch mounted to each one of the arms. The robotic arm or robotic welding system may use machine vision in its operation. A robotic using machine vision may include a camera mounted onto the arm to use in determining where to weld. A robotic welding system may be guided by machine vision or may weld to a preprogrammed position or may use a combination of both. While the robotic welding system welds the beam flanges 70 and beam web 80 together, clamping table 10 may alternately raise or lower each jaw 308 of each individual clamp assembly 30 as the robotic welding system progresses along the beam length to provide a monolithic weld joint as described herein.

A method for manufacturing an engineered beam of variable web width using the clamping table 10 disclosed herein is described. A first work piece is inserted into the formed recess 330 of clamping assembly 30 of the clamping table 10. A second work piece is inserted into the formed recess 330 of clamping assembly 30 opposite of the first clamping assembly 30. A third work piece is placed on a portion of opposing wedge slides 306 of clamping table 10. Clamping table 10 is actuated whereby the work pieces are moved into the desired fixed orientation by opposing wedge slides 306 and then secured in fixed position by the clamping table 10. In fixed position, the workpieces may be welded together to form a beam. Once welding operations conclude, clamping table 10 may release the formed workpiece and then be readied for the next operation.

It is to be understood that the terminology used herein is for the purpose of describing particular implementations only and is not intended to be limiting. As used in this specification, the singular forms "a", "an" and "the" include plural referents unless the content clearly indicates otherwise. As another example, "coupling" includes direct and/or indirect coupling of members. Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

We claim:

1. A clamping table apparatus, comprising:
   a base frame comprising at least two frame plates, at least two top rails, at least two bottom rails, at least two clevis plates, and at least one rod, wherein the frame plates are coupled to the top rails and the bottom rails, the clevis plates are attached to the top rails, and the rod is secured at opposing ends to a frame plate of the at least two frame plates;
   a clamping assembly comprising a clamp plate, a slider plate, a wedge slide, a jaw, a jaw actuator, a piston, a cylinder saddle, and a tube slider, wherein the clamping assembly is movably coupled to the rod; and,
   a table actuator attached to the clamping assembly and secured to the base frame for enabling bi-directional movement of the clamping assembly along the rod.

2. The apparatus of claim 1 further comprising:
   a conveyor frame attached to the base frame, the conveyor frame comprising at least two conveyor rails, at least two conveyor mount channels, at least two conveyor uprights, at least two support rails, and at least one roller attached to the conveyor upright; and,
   a conveyor cylinder operable to raise or lower the conveyor frame.

3. The apparatus of claim 1 further comprising:
   a roller attached to a distal end of the jaw.

4. The apparatus of claim 1 further comprising:
   at least two opposing clamping assemblies movably coupled to the rod.

5. A clamping table apparatus, comprising:
   a base frame comprising at least two frame plates, at least two top rails, at least two bottom rails, at least two clevis plates, and at least one rod, wherein the frame plates are coupled to the top rails and the bottom rails, the clevis plates are attached to the top rails, and the rod is secured at opposing ends to a frame plate of the at least two frame plates;
   at least two opposing clamping assemblies movably coupled to the rod, wherein the clamping assemblies include a wedge slide with an arcuate surface; and,
   a table actuator attached to each clamping assembly movably coupled to the rod for enabling bi-directional movement of each clamping assembly along the rod.

6. A method for configuring a beam workpiece for a work task, comprising:
   providing a configurable clamping table having a plurality of opposing clamping assemblies movably attached to the clamping table;
   fixing a first workpiece into a recess in a clamp plate of a first clamping assembly attached to the clamping table;
   fixing a second workpiece into a recess in a clamp plate of a second clamping assembly attached to the clamping table opposing the first clamping assembly attached to the clamping table;
   placing a third workpiece on a top surface of at least two opposing wedge slides of the first and second clamping assemblies;
   actuating the clamping table to move the opposing first and second clamping assemblies toward each other to orient and press the first, second, and third workpieces into contact with each other to form a beam workpiece; and,
   clamping the beam workpiece with the plurality of clamping assemblies.

7. The method of claim 6 further comprising:
   providing a conveyor frame for conveying a workpiece along the clamping table.

8. The method of claim 6 wherein said first workpiece is a beam flange, said second workpiece is a beam flange, and said third workpiece is a beam web.

9. The method of claim 6 wherein said work task comprises welding.

10. The method of claim 6 wherein said work task comprises machining.

* * * * *